Inventor
ERNEST A. COOKE

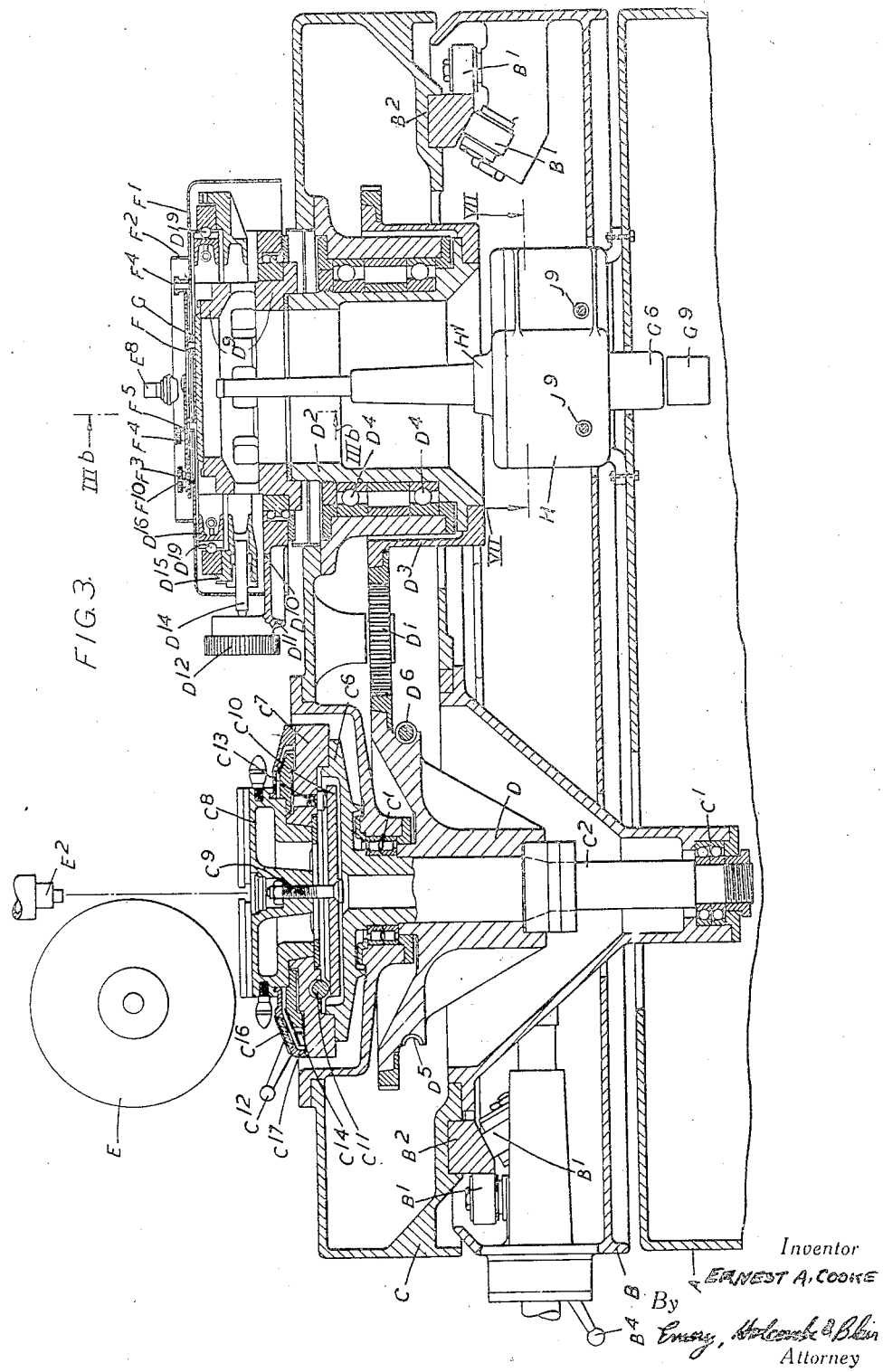

Inventor
ERNEST A. COOKE
By
Emery, Holcombe & Blair
Attorney

March 22, 1949.  E. A. COOKE  2,465,010
COPYING MACHINE WITH OPTICAL SYSTEM
Filed Sept. 7, 1944  9 Sheets-Sheet 5
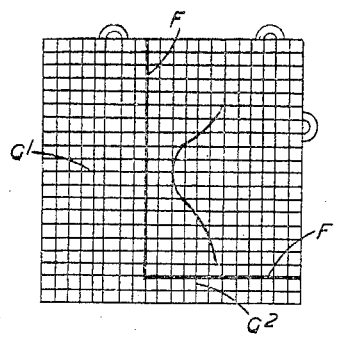
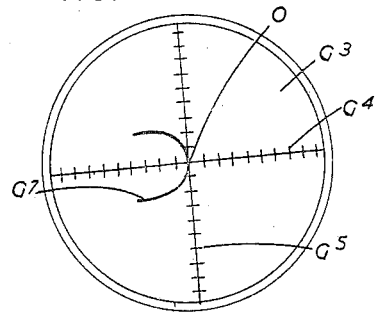
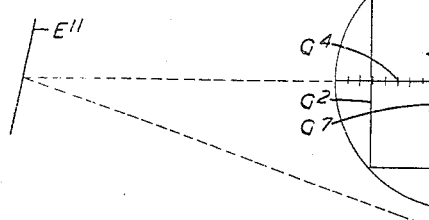
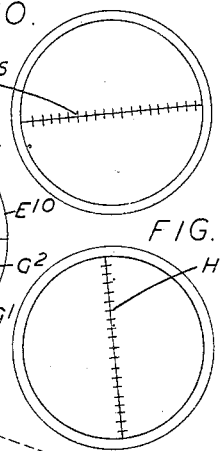
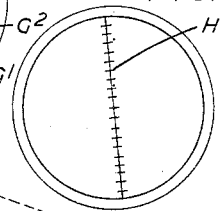
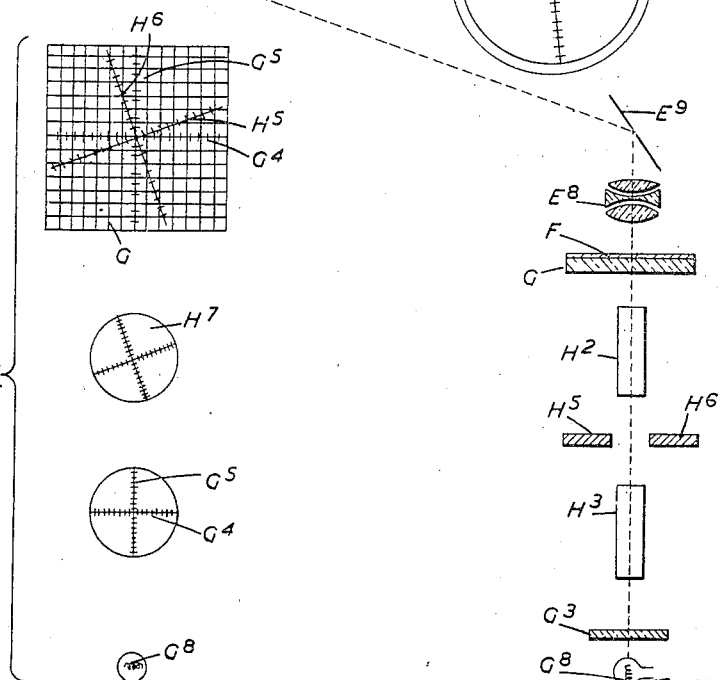

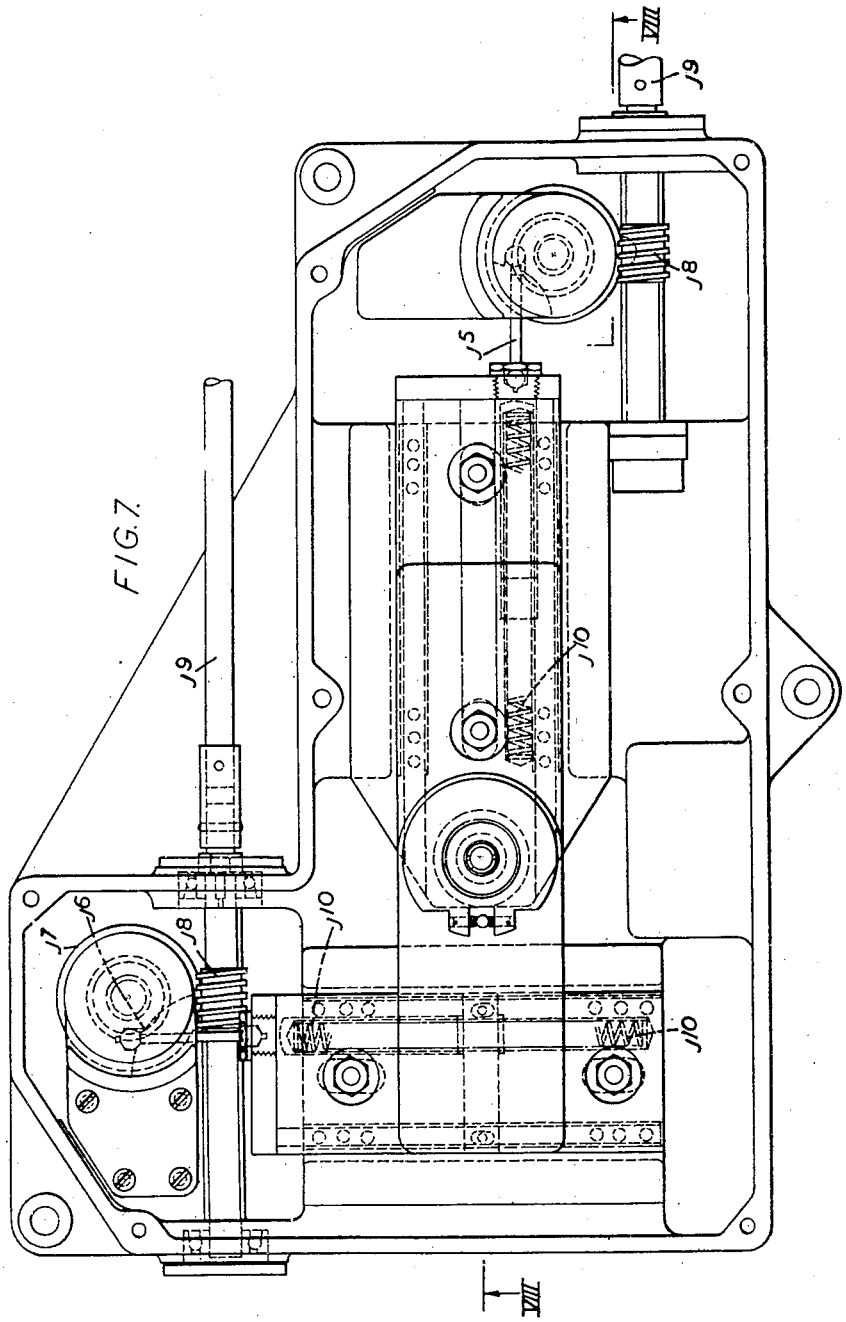

March 22, 1949. E. A. COOKE 2,465,010
COPYING MACHINE WITH OPTICAL SYSTEM
Filed Sept. 7, 1944 9 Sheets-Sheet 7
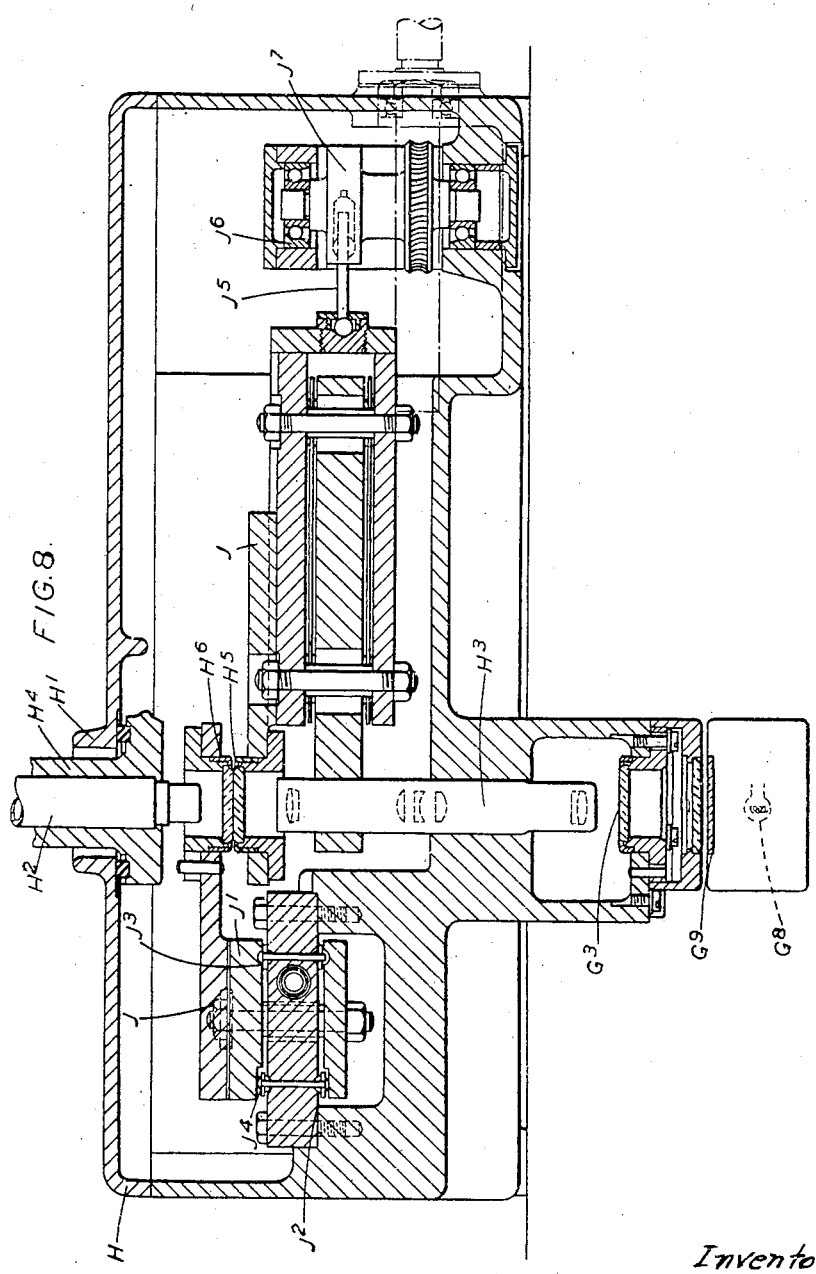
Inventor:
ERNEST A. COOKE
By
Emery, Holcombe & Blair
Attorney March 22, 1949.  E. A. COOKE  2,465,010
COPYING MACHINE WITH OPTICAL SYSTEM
Filed Sept. 7, 1944  9 Sheets-Sheet 9
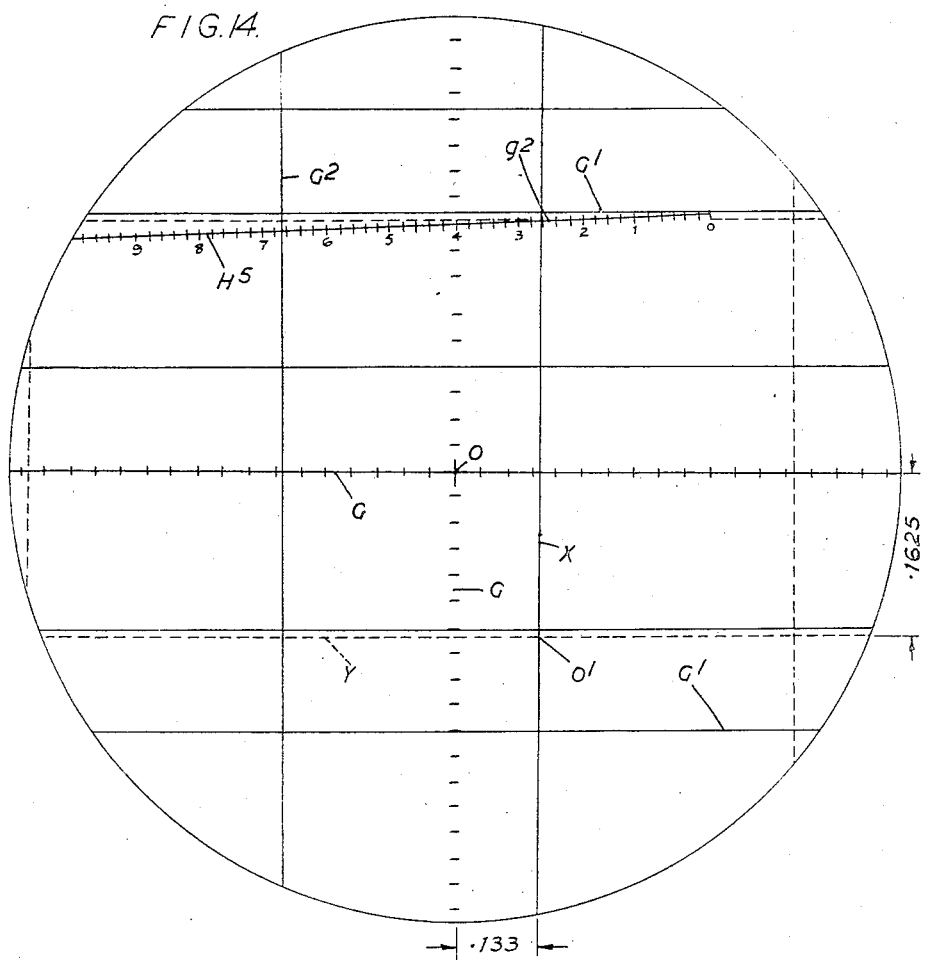
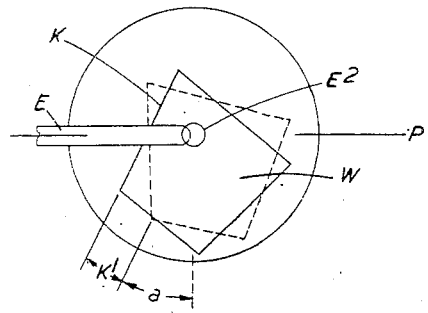
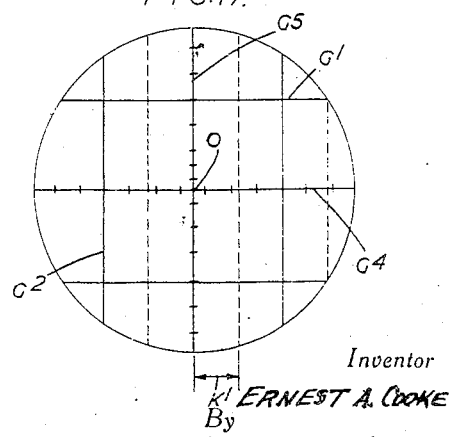
Inventor
ERNEST A. COOKE
By
Emery, Holcombe & Blair
Attorney Patented Mar. 22, 1949

2,465,010

UNITED STATES PATENT OFFICE 2,465,010

COPYING MACHINE WITH OPTICAL SYSTEM

Ernest Albert Cooke, Leicester, England, assignor to Taylor, Taylor & Hobson Limited, Leicester, England, a company of Great Britain Application September 7, 1944, Serial No. 553,067
In Great Britain July 16, 1943

23 Claims. (Cl. 51—165)

1

This invention relates to apparatus for accurately determining the position of a point in a reference plane with respect to an origin or datum point therein. Although the apparatus may be employed for other measuring purposes, one important use is for ensuring accurate relative adjustment of a grinding, cutting or other tool relatively to the work-piece in a copying machine, wherein it is usually necessary to determine such relative adjustment in accordance with the basic data, for example two Cartesian coordinate measurements. For such purposes it is usual for the machine to comprise two mutually perpendicular slideways, namely a lower or basic slideway carrying an upper slideway or carriage. In the event, however, of a slight error being present in the angle between the slideways, due to faulty manufacture or to wear, all the work produced by the machine will be liable to be untrue. One important object of the invention is to ensure that the relative location of tool and work can be effected with the desired degree of accuracy irrespective of the accuracy of mechanical slideways or guides.

Apparatus for accurately determining the position of a point in a reference plane with respect to an origin or datum therein, according to the invention, comprises a basic scale having a point thereon which represents the said origin or datum, a grid movable with respect to the basic scale and comprising a set of lines which intersect the basic scale at right angles for all positions of adjustment to the grid, and a fine-setting scale intersecting the basic scale but inclined to the grid lines and movable with respect to the basic scale and grid in a direction parallel to the basic scale, the grid and scales being superimposed at the reference plane.

Thus, course adjustment can first be effected by adjusting the grid along the basic scale, whereupon the measurement can be completed by cooperation of the inclined scale with any desired grid line and effecting the further fine adjustment required by moving the said grid line to the point on the inclined scale corresponding to the fine setting required.

When the apparatus is to be employed for determining the position of a point in the reference plane by two Cartesian coordinates, the apparatus comprises two mutually perpendicular basic scales whose point of intersection represents the said origin or datum, a grid movable relatively to the basic scales and comprising two sets of mutually perpendicular lines which respectively intersect the two basic scales at right angles for all positions of adjustment of the grid, and two mutually perpendicular fine-setting scales which intersect the two basic scales respectively but are inclined to the two sets of grid lines and are movable relatively to the basic scales and grid in directions parallel to the basic scales, the grid and scales being superimposed at the reference plane.

Preferably, means are provided whereby the scales are imaged in superimposition in the plane of the grid.

The fine-adjustment or movable scale, or each such scale, is preferably inclined to the associated set of grid lines by an angle whose tangent is represented by one division on the associated basic scale divided by the length of such basic scale from the origin, and when two fine-adjustment movable scales are employed they may be carried by a single graticule which is adjustable successively in two directions parallel to the two basic scales respectively, or the two fine-adjustment movable scales may be carried by two graticules respectively which are independently adjustable in the said two directions whilst retaining the inclined scales at right angles to each other.

The invention may be carried into practice in various ways but one construction, embodying the invention as applied to a projection copying machine, is shown by way of example in the accompanying drawings, in which Figure 1 shows the machine in front elevation,

Figure 3 illustrates the apparatus in section on the line III—III of Figure 2 but on a larger scale.

Figure 1:
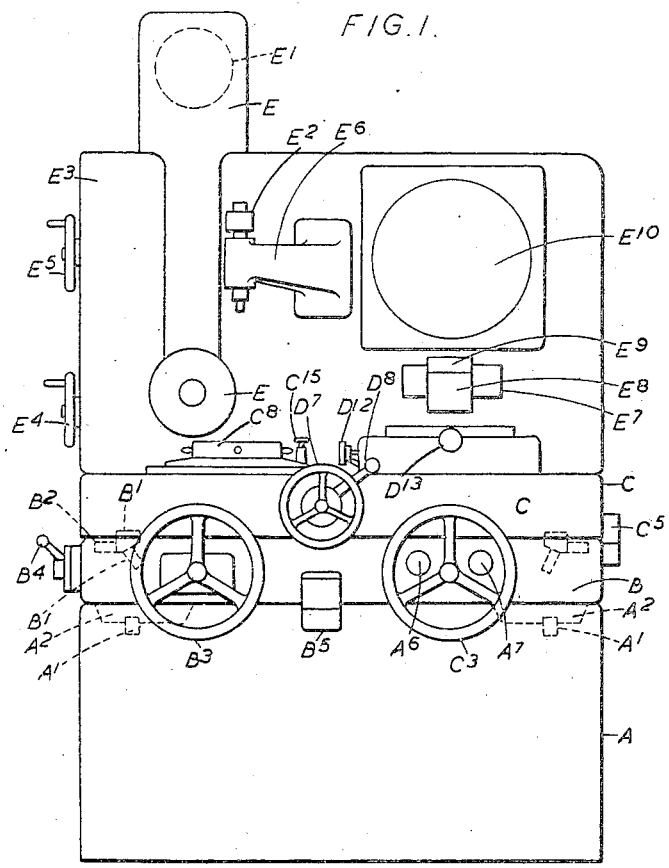
Figure 3B:
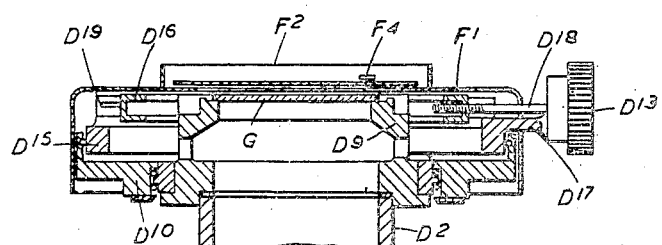
Figure 3b is a section on the line IIIb—IIIb of Figure 3, but with the optical parts omitted.
Figure 4:
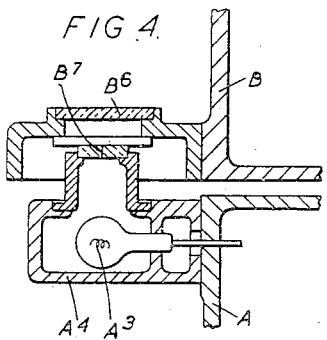
Figure 5:
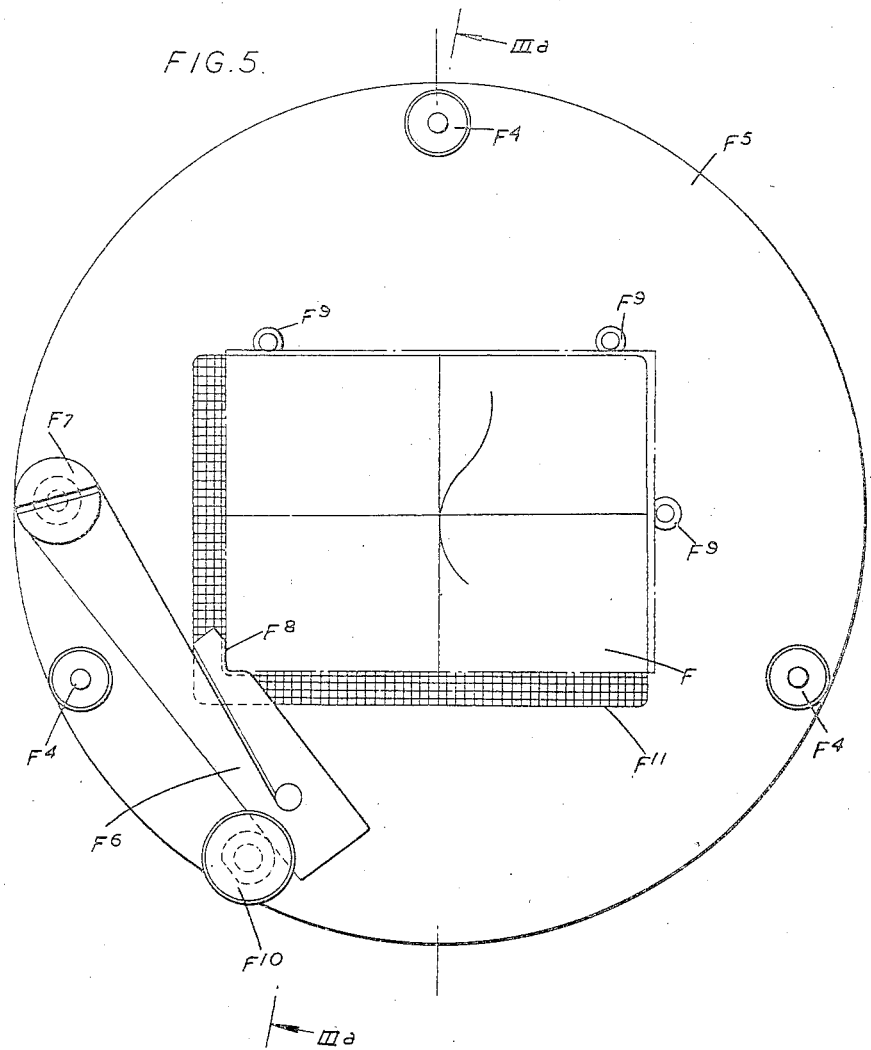
Figure 3A:
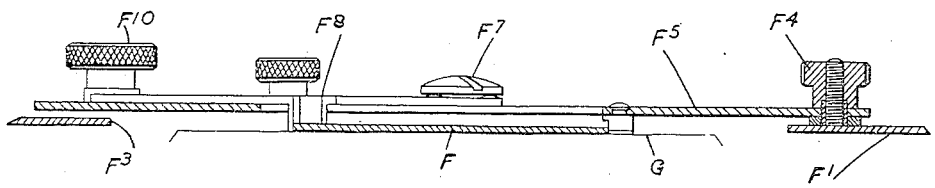
Figure 3a is a section on the line IIIa—IIIa of Figure 5.
Figure 13:
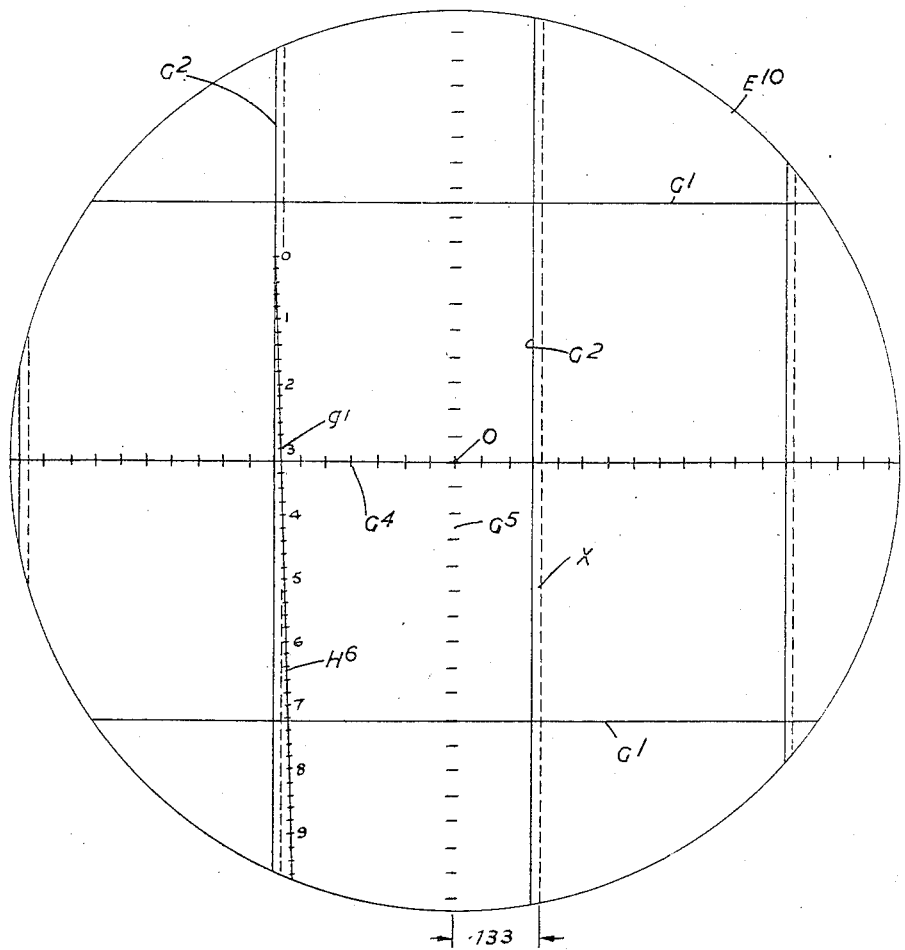

Figure 4 is a vertical section, on an enlarged scale, through the course indicator associated with the basic slide of Figure 1, Figure 5 shows, in plan, and also on an enlarged scale the arrangement of the fences for positioning the copy outline relatively to the copy support, Figure 6 is a plan of the grid associated with the copy support, Figure 7 is a section on the line VII—VII of Figure 3, Figure 8 is a section on the line VIII—VIII of Figure 7, Figures 9, 10 and 11 show respectively the fixed graticule and the two movable graticules associated therewith, Figure 12 is a diagrammatic representation of the optical system and projection screen which, for the sake of clarity, is shown turned through 90°, Figures 13 and 14 are diagrammatic illustrations of the successive steps for setting two coordinates by the apparatus according to the invention, Figure 15 is a diagrammatic representation of a modified arrangement of the parts in the coordinate setting device, and Figures 16 and 17 illustrate diagrammatically the steps for setting the apparatus for generating a straight line in accordance with basic data.

In the machine shown in the drawings the tool is assumed to consist of an abrasive wheel, but it will be understood that the nature of the tool will depend upon the operation to be performed on the work and may consist, for example of an end mill for cutting the work piece, or of a stylus or other marking device for imparting surface markings to the work.

As shown in Figures 1 to 4, the machine comprises a fixed base or pedestal A provided with roller tracks $A^1$ the rollers of which are engaged by bearing strips $A^2$ carried beneath a basic slide B whose upper surface has similar roller tracks $B^1$ which are, in turn, engaged by bearing strips $B^2$ carried beneath a main carriage C and extending in a direction at right angles to the bearing strips $A^2$. The main carriage C can thus be translationally adjusted relatively to the base A in all directions in the horizontal plane whilst remaining parallel to itself for all such positions of adjustment. The basic slide B and the main carriage C are translationally adjusted by two feed screws respectively operated by hand wheels $B^3$, $C^3$ and arranged in tubes which can be locked to and unlocked from the slide B and carriage C by locks $B^4$, $C^4$ respectively. By releasing the lock $B^4$ or $C^4$ the corresponding hand wheel $B^3$ or $C^3$ is, in effect, disconnected from its slide B or carriage C. For the purposes of indicating the adjustments of the basic slide B and the carriage C, two coarse indicators $B^5$, $C^5$ are provided each of which (as shown in Figure 4 in respect of the indicator associated with the slide B) comprises a transparent window $B^6$ having a linear scale marked thereon which lies over an index mark $B^7$ carried by a casing $A^4$ secured to the fixed base A of the machine and containing a lamp $A^3$. The window $B^6$ for the indicator $B^5$ is carried by the basic slide B, as shown in Figure 4, whilst the said window of the indicator $C^5$ is similarly carried by the carriage C whilst the corresponding index $B^7$ is carried by the slide B.

The main carriage C has, near one end, upper and lower bearings $C^1$ (Figure 3) for a work shaft $C^2$ the upper end of which has an integral flange $C^6$ secured to an annular carrier $C^7$ which supports a work table $C^8$. The work table has a central hollow boss carrying a stud $C^9$ whose head bears against the lower surface of a disc $C^{10}$ one side of which is acted upon by an eccentric spindle $C^{11}$ operated by a latching lever $C^{12}$, whilst the opposite side of the disc $C^{10}$ bears against a reaction stud or fulcrum $C^{13}$ on the carrier $C^7$. The carrier $C^7$ has a toothed rim $C^{14}$ engaged by a spur pinion (not shown) operated by a knob $C^{15}$ (Figure 1) so that when the lever $C^{12}$ is released, the table $C^8$ can be angularly adjusted by the screw $C^{15}$ relatively to the work shaft $C^2$, and locked in the desired position of adjustment by the lever $C^{12}$. For the purpose of accurately measuring the angular adjustment of the table $C^8$ relatively to the work shaft $C^2$, the carrier $C^7$ has a transparent scale $C^{16}$ with which cooperates a pointer or index $C^{17}$ on the annular rim $C^{14}$ of the work table $C^8$.

The work shaft $C^2$ has secured thereto a toothed drum D which is coupled through an idler pinion $D^1$ to a toothed drum $D^3$ secured to a hollow shaft $D^2$ mounted in bearings $D^4$ on the carriage C and hereinafter referred to as the copy shaft. Thus by reason of the interconnecting toothed gearing D, $D^1$, $D^3$ the two shafts $C^2$, $D^2$ not only move translationally as a unit with the carriage C, but are normally constrained to turn in synchronism about their vertical axes. For the purpose of effecting such angular adjustment of the work and copy shafts $C^2$, $D^2$ the drum D is furnished with a worm wheel $D^5$ engaged by a worm $D^6$ operated by a hand wheel $D^7$, a release $D^8$ being provided for throwing the worm $D^6$ into and out of engagement with the worm wheel $D^5$ at will.

Figure 2:
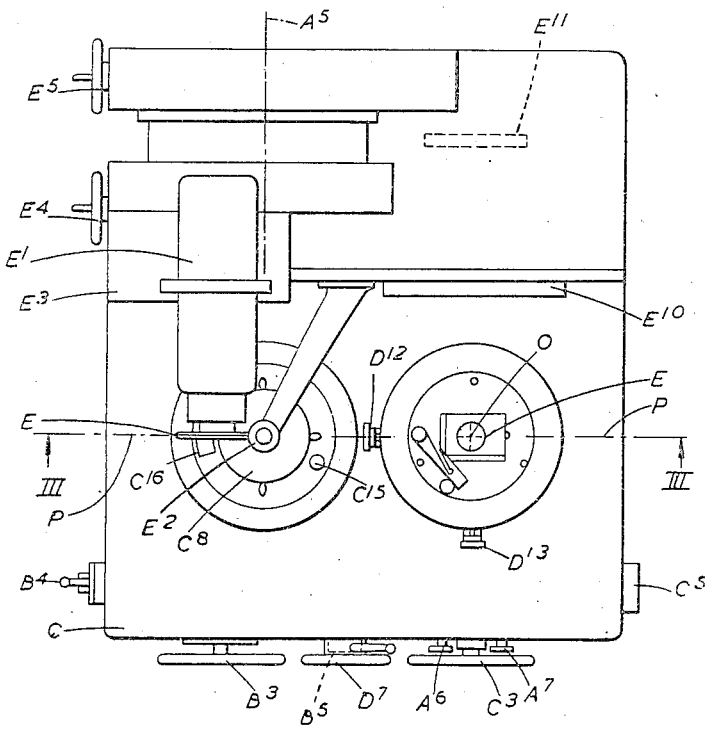
Figure 2 is a plan.

The grinding wheel E (Figures 1 and 2) is rotated by an electric motor $E^1$ and is reciprocated by a plunger, eccentric or the like (not shown) in a frame $E^3$ as shown in Figure 2. In order to allow for wear of the grinding wheel E, the unit comprising the grinding wheel, motor $E^1$ and guides $E^3$ can be adjusted horizontally by a hand wheel $E^4$ whilst the said unit can be tilted about an axis extending through the operative edge of the grinding wheel, and indicated at $A^5$, by means of a hand wheel $E^5$. This tilting adjustment permits the angle of reciprocation of the grinding wheel to be determined as desired to impart an angle of rake to the work.

Mounted on a bracket $E^6$ extending from the back of the base A is a work microscope $E^2$, a second bracket $E^7$ carrying a projection objective $E^8$, the distance between the optical axes of the work microscope $E^2$ and the projection objective $E^8$ being approximately equal to the distance between the axes of rotation of the work shaft $C^2$ and the copy shaft $D^2$, whilst the plane containing these two optical axes is parallel to that containing the said axes of rotation for all positions of adjustment of the main carriage C. The operative edge of the grinding wheel E lies on the optical axis of the work microscope $E^2$ so that when the carriage C is in its zero position, that is to say when both the coarse adjustment indicators $B^5$, $C^5$ read zero, the operative edge of the grinding wheel E and the optical axis of the work microscope $E^2$ coincide with the axis of rotation of the work shaft $C^2$ and the optical axis of the projection objective $E^8$ coincides with the axis of rotation of the copy shaft $D^2$.

The projection objective $E^8$ has an associated deflector unit $E^9$ whereby the image to be projected, as hereinafter described, is deflected on to a mirror $E^{11}$ at the back of the support A and thence to the back of a translucent vertical projection screen $E^{10}$ carried by the base A, as clearly shown in Figure 12.

Mounted on the upper end of the tubular copy shaft $D^2$ is an annular carrier or window $D^9$ around which is angularly adjustable a spider $D^{10}$ having a radial arm $D^{11}$ carrying the bearing for an adjustable head $D^{12}$ secured to a screw-threaded shaft $D^{14}$ for operating a slide $D^{15}$ along guides formed in the spider $D^{10}$ and extending parallel to the length of the arm $D^{11}$. The slide $D^{15}$ is similarly furnished with a radial arm $D^{17}$ (Figure 3b) carrying the bearing for an adjustable head $D^{13}$ secured to a screw-threaded shaft $D^{18}$ for operating a slide $D^{16}$ along guides $D^{19}$ formed on the slide $D^{15}$ at right angles to the length of the arm $D^{11}$. Thus, by means of the heads $D^{12}$, $D^{13}$ the two slides $D^{15}$, $D^{16}$ can be adjusted horizontally and in mutually perpendicular directions. Arranged on the upper slide $D^{16}$ is a hood $F^1$ having a guard ring or flange $F^2$ surrounding a central opening $F^3$. Secured to the upper face of the hood within the flange $F^2$ by releasable studs $F^4$ is a disc $F^5$ (Figure 5) which carries a spring finger $F^6$ pivoted at $F^7$ and furnished with a V-notch $F^8$ which is arranged to engage one corner of a copy outline support F, for example a photographic transparency. The support F is thus resiliently pressed into engagement with three fences $F^9$ (carried by the disc $F^5$) by the cam action of a knurled head $F^{10}$ as shown in Figure 5. Thus, the copy outline F is resiliently held in position over a window $F^{11}$ in the disc $F^5$ by the finger $F^6$ and can be accurately positioned relatively to the shaft $D^2$ by translational adjustment, in either or both of the two mutually perpendicular directions by the knurled heads $D^{12}$ and $D^{13}$, and by angular adjustment about the shaft $D^2$.

Arranged at the upper end of the carrier $D^9$ is a grid G (Figures 3 and 6) formed of transparent material and having marked thereon two parallel sets of lines $G^1$, $G^2$ which sets can be regarded as respectively parallel to two mutually perpendicular median lines whose origin, when the carriage C is in its zero position, coincides with the axis of rotation of the copy shaft $D^2$ and with the optical axis of the projection objective $E^8$, the markings $G^1$, $G^2$ thus being similar to those on a sheet of graph paper through the lines of the grid G will all be of substantially the same density.

For the purpose of projection copying by the use of the copy outline F, the outline support is accurately positioned relatively to the grid G by angular adjustment of the spider $D^{10}$ and by translational adjustment by means of the knurled heads $D^{12}$ and $D^{13}$. Copying directly from the outline is then effected as described in detail below.

For the purpose, however, of generating the desired outline from basic data a coordinate-setting unit is mounted on and secured to the fixed base A. This coordinate setting unit is enclosed within a casing H (Figures 3 and 7 and 8) whose upper wall has an opening $H^1$ the vertical axis of which coincides with the optical axis of the projection objective $E^8$ when the carriage C is in its zero position. The unit H comprises two identical optical systems $H^2$, $H^3$ in optical alignment with the tube or mount $H^4$ arranged in the opening $H^1$ and similarly aligned with a fixed graticule $G^3$ having marked thereon two mutually perpendicular scales $G^4$, $G^5$ as shown in Figure 9. The distance between the origin O of the fixed graticule $G^3$ and the optical axis of the work microscope $E^2$ is exactly equal to the distance between the axes of rotation of the work and copy shafts. The point of intersection or origin O of the scales $G^4$, $G^5$ thus lies in optical alignment with the optical axis of the projection objective $E^8$ when the carriage C is in its zero position, i. e. with the axes of rotation of the work and copy shafts lying in the zero plane P—$P^1$ containing the said origin O and the optical axis of the work microscope. The fixed graticule $G^3$, which is detachably arranged in an end cap $G^6$, also has marked thereon the outline $G^7$ of the tool E, with the operative edge of the said outline lying at the origin O.

Disposed between the two optical systems $H^2$, $H^3$ are two movable graticules as shown in Figures 10, 11 and 12 having marked thereon respectively two fine setting scales $H^5$, $H^6$.

The arrangement of the graticules $H^5$, $H^6$ is such that though each of these scales is slightly inclined to the corresponding scales of the fixed graticule $G^3$, as described below, the two scales $H^5$, $H^6$ are always at right angles to each other. Each of the movable graticules $H^5$, $H^6$ is carried by a holder J which is adjustable along a slide comprising upper and lower slideways $J^1$, $J^2$ each constituted by two ball tracks one of which $J^3$ is curved to suit the curvature of the balls associated therewith whilst the other $J^4$ is flat and open-sided so that centralisation of the slideways will be determined by one pair of tracks only. Each slide is operated by one end of a ball-ended rod $J^5$ the other end of which lies in a short arcuate slot or groove $J^6$ formed in the circumference of an actuating disc $J^7$ operated by a worm $J^8$ secured to a shaft $J^9$. The two shafts $J^9$ are actuated by two knurled heads $A^6$ and $A^7$ respectively, these heads lying outside the casing of the machine adjacent to the operator as shown in Figures 1 and 2.

Each slide J is loaded by a centering spring $J^{10}$ so that the corresponding graticule $H^5$ or $H^6$ is adjusted to one side or the other of a central position by the associated knurled head $A^6$ or $A^7$ against the action of the corresponding spring $J^{10}$. With both slides J in this central position, the point of intersection of the two graticules $H^5$ and $H^6$ coincides with the optical axis of the systems $H^2$, $H^3$ but with each scale $H^5$ or $H^6$ inclined to the associated fixed graticule scale $G^4$ or $G^5$ by an angle whose tangent is represented by one division of the fixed scale $G^4$ or $G^5$ divided by the total length of such fixed scale.

When both the movable graticules have been withdrawn from the optical axis as shown in Figure 12 the fixed graticule scales $G^4$, $G^5$ are imaged in the plane of the grid G and these images, as also the grid lines $G^1$, $G^2$, the copy outline F and the tool outline $G^7$ are projected in superimposition on the screen $E^{10}$.

Having accurately positioned the copy outline F on the grid G until the images, on the screen $E^{10}$, of the outline F and tool profile $G^7$ are in contact at the origin O, the hand wheels $B^3$, $C^3$ and $D^7$ are operated so that the said origin or datum O as imaged on the screen follows the image of the outline F. An accurate copy, in accordance with the optical reproduction scale of the projection objective $E^8$ will thus be produced on the work by the tool E.

Assuming now that it is desired to set the work relatively to the tool E in accordance with a point whose position relatively to the centre of the copy table or grid G is represented by the Cartesian coordinates 0.133 west and 0.1625 north, the disc $F^5$ carrying the copy outline is removed and the carriage C is first brought to its zero position by operation of the hand wheels $B^3$, $C^3$ that is to say until the origin O of the fixed graticule $G^3$, as imaged on the screen $E^{10}$, coincides with the intersection of any two of the grid lines $G^1$, $G^2$, the inclined scales $H^5$, $H^6$ still being withdrawn so that neither appears on the screen $E^{10}$. The hand wheel $C^3$ is now adjusted, so as to adjust the carriage C, until the indicator $C^5$ reads "1," and the basic slide B is similarly adjusted by the hand wheel $B^3$ until the indicator $B^5$ reads "1," the carriage C being adjusted towards the operator, whilst the basic slide B is adjusted to the right. The hand wheel $B^3$ is then again adjusted in the same direction, until the grid line $G^2$ lying nearest to the origin O intersects the east portion of the fixed scale $G^4$ at the point "0.03" as shown in Figure 13. By adjusting the head $A^7$ the movable graticule $H^6$ is brought on to the screen $E^{10}$ and is adjusted until the zero of the inclined scale $H^6$ lies on any convenient grid line $G^2$ and, by operating the hand wheel $B^3$, the carriage C is again adjusted to the right until the grid line $G^2$ upon which the zero of the scale $H^6$ is resting (as shown to the left of Figure 13) intersects the scale $H^6$ at the point $g^1$ i. e. the graduation "0.003" thereon. The grid lines $G^2$ are now in the position shown dotted in Figure 13, one of these grid lines, indicated at X, lying accurately at a distance 0.133 from the origin O. To effect the north setting the hand wheel $C^3$ is adjusted to move the carriage C towards the operator until the grid line $G^1$ lying nearest to the origin O intersects the south portion of the scale $G^5$ at the point "0.06" thereon, the grid lines $G^1$ and $G^2$ being now positioned as shown in full lines in Figure 14. Having adjusted the head $A^7$ until the inclined scale $H^6$ no longer appears on the screen $E^{10}$, the head $A^6$ is adjusted until the inclined graticule scale $H^5$ appears on the screen with its zero lying on any convenient grid line $G^1$, e. g. as shown at the top of Figure 14. The hand wheel $C^3$ is now adjusted until the grid line $G^1$ upon which the zero of the scale $H^5$ is resting intersects the scale $H^5$ at the point $g^2$ i. e. the graduation "0.0025" thereon, the grid lines $G^1$ then lying in the positions shown dotted in Figure 14, i. e. with the grid line $G^1$ which was first adjusted with respect to the origin O lying accurately at the distance 0.1625 from the origin O as indicated at Y.

Thus, the point of intersection $O^1$ of the lines X and Y is that represented by the Cartesian coordinates 0.133 and 0.1625 relatively to the origin O which represents the operative edge of the tool.

Though it is preferred to provide two independently and successively adjustable inclined graticules for the fine setting scales respectively since this permits the operator to check back on the adjustments during measurement, the two inclined fine setting scales may be carried by a single movable graticule as shown at $H^7$ in Figure 15 and which can be adjusted successively in two directions parallel to the two sets of lines on the grid G respectively.

In addition to direct copying from a copy outline positioned on the grid G as above described and setting of the machine in accordance with basic data, the apparatus may be utilsed for setting the work so as to grind straight lines in accordance with basic data. To this end in order, for example to grind a straight line K as shown in Figure 16, this line lying at a vertical distance $K^1$ from the origin O, the carriage C is set in the zero position, i. e. with the axes of the work and copy shafts in accurate alignment with the work microscope $E^2$ and projection objective $E^3$. The feed screws are locked against effective operation by means of the locking levers $B^4$ and $C^4$, the drums D and $D^3$ being thus also locked against rotation. Having released the latching lever $C^{12}$, the table $C^8$ is angularly adjusted, with the aid of the pinion $C^{15}$ and scale $C^{16}$, through the angle $a$ (Figure 16) that is to say until the line K to be generated on the work lies at right angles to the plane P. the workpiece now lying in the position shown dotted in Figure 16. The work table $C^8$ having been relocked to the drum D in this position of relative adjustment, the lock $B^4$ is released and the hand wheel $B^3$ is adjusted so as to move the carriage C until the grid line $G^2$ lying nearest to the origin O on the screen $E^{10}$ intersects the east portion of the fixed graticule scale $G^4$, through the graduation thereon corresponding to the dimension $K^1$. The grid lines $G^2$ are now positioned as shown dotted in Figure 17. Having relocked the lever $B^4$ the lock $C^4$ is released and the hand wheel $C^3$ is operated, the carriage C being thus traversed over the slide B so that the desired straight line K is generated on the work piece W by the tool E.

As will be readily seen, measuring apparatus according to the invention, whether utilised for copying machines as above described or for other purposes, has the advantage that congestion of the reference plane by a large number of scale graduations is avoided since initial coarse adjustments are effected on the indicators associated with the carriage and basic slide, and the grid has no subdivision, whilst the fixed or basic scale or scales require only the main divisions and one set of subdivisions. The finer graduations are provided for by the inclined scale or scales which, in turn, need not appear on the reference plane until after the preliminary coarser adjustments have been made, and can be withdrawn from the reference plane as soon as the finer adjustment has been made. Moreover, each inclined scale can cooperate with any convenient line of the corresponding set of lines on the grid, so that the finer adjustment can be effected at any part of the grid which may be least occupied by other scales. Thus, each of the scales, both basic and movable can be short and self-contained. Further, accuracy of the measurements made will not be dependent upon the accuracy of finish or inclination of any mechanical slide, whether on the machine proper or with the coordinate setting unit, the guides for the movable graticule being self centering and respectively parallel and normal to the primary plane.

The apparatus facilitates accurate coincidence, during operation of the machine, of the operative edge of the tool in use with the contour to be generated since the outline of the tool (either as marked on the fixed graticule or superimposed thereon from a separate slide bearing the tool outline) is reproduced in the plane of the grid and superimposed on the work or copy outline. Projection of various copy outlines is facilitated by providing, not only for angular adjustment of the copy holder, but also for translational adjustment thereof, relatively to the grid, in two mutually perpendicular directions.

It will be appreciated that the construction more specifically described is given by way of example only, and that details may be modified to suit requirements. Moreover, the invention is not limited for use in copying machines, but may be employed for other purposes requiring accurate measurement from a given origin or datum in accordance with a single linear value, or in accordance with two coordinates.

What I claim as my invention and desire to secure by Letters Patent is:

1. Apparatus for accurately determining the position of a point in a reference plane with respect to an origin or datum point therein, comprising a basic scale having a point thereon which represents the said origin or datum, a grid movable with respect to the basic scale and comprising a set of lines which intersect the basic scale at right angles for all positions of adjustment of the grid, and a fine-setting scale intersecting the basic scale but inclined to the grid lines at an angle whose tangent is represented by one division of the basic scale divided by the whole length of the basic scale, and means whereby the fine-setting scale is adjusted, with respect to the basic scale and grid, in a direction parallel to the basic scale.

2. Apparatus for determining the position of a point in a reference plane by Cartesian coordinates with respect to an origin or datum point in such plane, comprising two mutually perpendicular basic scales whose point of intersection represents the said origin or datum, a grid movable relatively to the basic scales and comprising two sets of mutually perpendicular lines which respectively intersect the two basic scales at right angles for all positions of adjustment of the grid, two mutually perpendicular fine-setting scales which intersect the two basic scales but are inclined to the two sets of grid lines respectively at an angle whose tangent is represented by one division of the basic scales divided by the whole length of one such basic scale, and means whereby the fine-setting scales are adjusted, relatively to the basic scales and grid, in directions parallel to the basic scales respectively.

3. Apparatus as claimed in claim 1, having means whereby the scales are imaged in superimposition in the plane of the grid.

4. Apparatus as claimed in claim 2, having means whereby the scales are imaged in superimposition at the plane of the grid.

5. Apparatus for accurately determining the position of a point in a reference plane with respect to a datum point or origin in said plane comprising two mutually perpendicular basic scales whose point of intersection represents the said origin or datum, a grid movable with respect to the basic scales and comprising two sets of mutually perpendicular lines which respectively intersect the two basic scales at right angles for all relative positions of the grid and basic scales, two mutually perpendicular fine-setting scales which intersect the two basic scales respectively but are inclined to the two sets of grid lines, each such fine-setting scale being inclined to the associated set of grid lines at an angle whose tangent is represented by one division of the associated basic scale divided by the length of the scale from the origin, means whereby the fine-setting scales are respectively adjusted in directions parallel to the basic scales, and means whereby the basic scales and fine-setting scales are imaged in superimposition at the plane of the grid.

6. Apparatus as claimed in claim 5, in which the inclined or fine-setting scales are carried by a single graticule which is adjustable successively in two directions parallel to the basic scales respectively.

7. Apparatus as claimed in claim 5, in which the inclined or fine-setting scales are carried by two graticules respectively which are independently adjustable in two directions parallel to the basic scales whilst retaining the inclined scales at right angles to each other.

8. A copying machine comprising a supporting base, a tool support carried by said base, a work support carried by the base, a copy support carried by the base, a datum point on the base and associated with the copy support, the tool and datum point being spaced apart in a zero plane in accordance with the spacing between the work and copy supports, means for effecting relative adjustment of the work and copy supports relatively to the tool and datum, interconnecting mechanism between the said supports whereby movement of the work support relatively to the tool support is a reproduction of the movement of the copy support relatively to the datum, and coordinate setting apparatus associated with the copy support for determining the position of the work support relatively to the tool support and comprising a basic scale carried by the supporting base and having a point thereon representing the said datum, a grid carried by the copy support and movable therewith relatively to the basic scale, said grid comprising a set of lines which intersect the basic scale at right angles for all positions of adjustment of the copy support and grid, a fine-setting scale carried by the supporting base and intersecting the basic scale but inclined to the grid lines, and means whereby the fine-setting scale is adjusted relatively to the basic scale and grid in a direction parallel to the basic scale, the scales being superimposed at the plane of the grid.

9. A copying machine comprising a supporting base, a tool support carried by the base, a work support carried by the base, a copy support carried by the base, a datum point on the base and associated with the copy support, the tool and datum being spaced apart in a zero plane by a distance equal to the spacing between the work and copy supports, mechanism whereby translational movement of the work and copy supports is effected relatively to the tool and datum in a plane at right angles to the zero plane, interconnecting mechanism between said supports whereby movement of the work support relatively to the tool support is a reproduction of the movement of the copy support relatively to said datum, and coordinate setting apparatus associated with the copy support for determining the position of the work support relatively to the tool support and comprising two mutually perpendicular scales carried by the supporting base and whose point of intersection or origin represents the said datum, a grid carried by the copy support and movable therewith relatively to the basic scales, said grid comprising two sets of mutually perpendicular lines which respectively intersect the two basic scales at right angles for all positions of adjustment of the copy support and grid, two mutually perpendicular fine-setting scales carried by the supporting base and which intersect the two basic scales respectively but are inclined to the two sets of grid lines, and means whereby the two inclined scales are adjusted relatively to the grid in directions parallel to the basic scales respectively, the fine-setting scales being inclined to the basic scales respectively by an angle whose tangent is represented by one division of the basic scale divided by the whole length of the basic scale.

10. A copying machine comprising a supporting base, a tool support carried by the base, a work support carried by the base, a copy support carried by the base, a datum carried by the base and associated with the copy support, the tool and datum being spaced apart in a zero plane by a distance equal to the spacing between the work and copy supports, mechanism whereby translational movement of the work and copy supports is effected relatively to the tool and datum in a plane at right angles to the zero plane, interconnecting mechanism between said supports whereby movement of the work support relatively to the tool support is a reproduction of the movement of the copy support relatively to said datum, and coordinate setting apparatus associated with the copy support for determining the position of the work support relatively to the tool support and comprising two mutually perpendicular basic scales carried by the supporting base and whose point of intersection or origin represents the said datum, a grid carried by the copy support and movable therewith relatively to the basic scales, said grid comprising two sets of mutually perpendicular lines which respectively intersect the two basic scales at right angles for all positions of adjustment of the copy support and grid, two mutually perpendicular fine-setting scales carried by the supporting base and which intersect the two basic scales respectively but are inclined to the two sets of grid lines, each such fine-setting scale being inclined to the associated set of grid lines at an angle whose tangent is represented by one division of the associated basic scale divided by the length of the scale from the origin, means whereby the fine-setting scales are respectively adjusted in directions parallel to the basic scales, and optical means whereby the basic scales and fine-setting scales are imaged in superimposition at the plane of the grid.

11. A copying machine as claimed in claim 10, in which the inclined or fine-setting scales are carried by a single graticule which is adjustable successively in two directions parallel to the basic scales respectively.

12. A copying machine as claimed in claim 10, in which the inclined or fine-setting scales are carried by two graticules respectively, which are independently adjustable in two directions parallel to the basic scales whilst retaining the inclined scales at right angles to each other.

13. A copying machine as claimed in claim 8, in which the work and copy supports are mounted on a slide adjustable in two mutually perpendicular directions in a plane normal to the zero plane, initial adjustment of the grid relatively to the basic scale being indicated by coarse adjustment indicators carried by the slide and supporting base respectively.

14. A copying machine as claimed in claim 10, in which the work and copy supports are mounted on a slide adjustable in two mutually perpendicular directions in a plane normal to the zero plane, initial adjustment of the grid relatively to the basic scale being indicated by coarse adjustment indicators carried by the slide and supporting base respectively.

15. A copying machine comprising a supporting base, a tool support carried by the base, a work shaft rotatable about a work axis on the base, a work table carried by the work shaft, a copy shaft rotatable about a copy axis on the base, a datum carried by the base and associated with the copy shaft, the tool and datum being spaced apart in a zero plane by a distance equal to that between the work and copy axes, mechanism for simultaneously adjusting the work and copy shafts relatively to the tool and datum in two mutually perpendicular directions in a plane normal to the zero plane, driving drums on the work and copy shafts, interconnecting mechanism between said drums through which angular movement about the work and copy axes is transmitted to said shafts in synchronism, translational and rotational movement of the work shaft relatively to the tool support thus being a reproduction of the translational and rotational movement of the copy shaft relatively to the datum, and coordinate setting apparatus associated with the copy shaft for determining the position of the work support relatively to the tool support and comprising two mutually perpendicular basic scales carried by the supporting base and whose point of intersection or origin represents the said datum, a grid carried by the copy table and movable therewith relatively to the basic scales, said grid comprising two sets of mutually perpendicular lines which respectively intersect the two basic scales at right angles for all positions of adjustment of the copy table and grid, two mutually perpendicular fine-setting scales carried by the base and which intersect the two basic scales respectively but are inclined to the two sets of grid lines, and means whereby the two inclined scales are adjusted relatively to the grid in directions parallel to the basic scales respectively, and means whereby the grid is adjusted relatively to the scales, by simultaneous adjustment of the work and copy shafts relatively to the zero plane, the fine-setting scales being inclined to the basic scales respectively by an angle whose tangent is represented by one division of the basic scale divided by the whole length of one basic scale.

16. A copying machine as claimed in claim 15, having means for effecting angular adjustment of the work table about the work axis and relatively to the work shaft.

17. A copying machine as claimed in claim 8, having a projection objective carried by the supporting base in optical alignment with the datum on the basic scale and which project images of the grid, basic scale and inclined scale in superimposition on a screen carried by the supporting base.

18. A copying machine as claimed in claim 15, having a projection objective carried by the supporting base in optical alignment with the datum on the basic scales and which projects images of the grid, basic scales and inclined scales in superimposition on a screen carried by the supporting base.

19. A copying machine as claimed in claim 10, having means for positioning a sample outline on the copy support in predetermined relationship with respect to the grid.

20. A copying machine as claimed in claim 15, having means for positioning a sample outline on the copy table in predetermined relationship with respect to the grid, and for adjusting the said sample both angularly and translationally with respect to the grid.

21. A copying machine as claimed in claim 9, in which the two mutually perpendicular basic scales are carried by a single fixed graticule upon which a profile of the tool is superimposed, the part of the said profile which represents the operative part of the tool being coincident with the origin of the basic scales.

22. A copying machine as claimed in claim 15, in which the two mutually perpendicular basic scales are carried by a single fixed graticule upon which a profile of the tool is superimposed, the part of the said profile which represents the operative part of the tool being coincident with the origin of the basic scales.

23. A copying machine as claimed in claim 15, having means whereby the basic scales and fine-setting scales are optically imaged in superimposition at the plane of the grid.

ERNEST ALBERT COOKE.

REFERENCES CITED

The following references are of record in the file of this patent:

UNITED STATES PATENTS

| Number | Name | Date |
|---|---|---|
| 2,179,388 | Taylor et al. | Nov. 7, 1939 |
| 2,206,587 | Taylor | July 2, 1940 |